United States Patent [19]

Minor

[11] Patent Number: 4,827,354
[45] Date of Patent: May 2, 1989

[54] COLLATING DOCUMENT PRINTER

[75] Inventor: James C. Minor, Rochester, N.Y.

[73] Assignee: Eastman Kodak Company, Rochester, N.Y.

[21] Appl. No.: 112,184

[22] Filed: Oct. 26, 1987

[51] Int. Cl.$^4$ .................. H04N 1/21; G03G 15/00
[52] U.S. Cl. ........................... 358/296; 355/323
[58] Field of Search .................. 358/296, 300, 302; 355/3 SH, 14 SH; 346/108, 134

[56] References Cited

U.S. PATENT DOCUMENTS

| | | | |
|---|---|---|---|
| 4,033,694 | 7/1977 | Ferrari | 355/3 R |
| 4,179,213 | 12/1979 | Queener | 355/14 R |
| 4,384,782 | 5/1983 | Acquaviva | 355/3 SH |
| 4,511,243 | 4/1985 | Smith | 355/14 CU |

OTHER PUBLICATIONS
IBM Tech. Disc. Bulletin, V28, No. 8, Jan. 86, p. 3641.

Primary Examiner—E. A. Goldberg
Assistant Examiner—Mark Reinhart
Attorney, Agent, or Firm—Milton S. Sales

[57] ABSTRACT

Electronic printers, wherein multi-page documents to be printed are received as character code signals to be applied to a pattern generator for mapping and rasterization, electronically store the character code signals of a multi-page document for repeatedly presenting the stored signals to the pattern generator in the proper sequence to produce a plurality of collated printed sets. If the number of skip cycles required while the print engine waits for the pattern generator to finish mapping a particular page during the first printing of the document exceeds a threshold, the print engine will assume a shut down mode during mapping of that page on subsequent printings.

5 Claims, 3 Drawing Sheets

COLLATING DOCUMENT PRINTER

BACKGROUND OF THE INVENTION

1. Field of the Invention

This invention relates generally to electronic printers wherein multi-page documents to be printed are received as character code signals to be applied to a pattern generator for mapping and rasterization, and more particularly to such printers having means to electronically store the character code signals of a multi-page document and for repeatedly presenting the stored signals to the pattern generator in the proper sequence to produce a plurality of collated printed sets.

2. Description of the Prior Art

Computer work stations, word processors, and the like generally produce print jobs in character code signals, such as for example ASCII code, page description language, page description file formats, and the like. Multi-page document print jobs are queued in a print server, and spooled one page at a time to a pattern generator. The pattern generator converts the coded signals to a rasterized video data stream for printing pixel (picture element) by pixel. When a plurality of collated printed sets of a multi-page document are desired, the print server repeatedly presents the stored character code signals to the pattern generator in the proper page sequence, as often as is needed to produce the desired number of collated printed sets.

During production of a plurality of collated printed sets the character code signals are repeatedly spooled one page at a time from the print server, and the mapping and rasterization process of each page of the multi-page document is repeated for every collated printed set. The mapping process is very processor intensive and, on complex pages, may take as much as a minute per page. In high speed electrostatographic printers, the pattern generator is often unable to keep up with the print engine, which goes into a "skip cycle" mode until the electronic image for the next page to be printed is available. In the skip cycle mode, the print engine continues to run, but without paper feed, and with appropriate adjustment to charging, toning, erasing, and cleaning processes. Reference is made to IBM Technical Disclosure Bulletin Vol. 28, No. 8, January 1986 for a fuller description of the skip cycle process.

There is a predetermined number of skip cycles beyond which it becomes desirable to shut the print process down, either entirely or partially, to save energy as well as wear and tear on the print engine. However, unless the predetermined number of skip cycles are reached, the shutting down and restarting of the print engine can cause more reliability problems than the reduction of the wear and tear would justify.

SUMMARY OF THE INVENTION

It is an object of the present invention to provide an electronic printer of the type wherein multi-page documents to be printed are received as character code signals which are repeatedly applied in page sequence to a pattern generator for mapping and rasterization to produce a plurality of collated printed sets, with means to predict the number of skip cycles which will be required while the print engine is waiting for the pattern generator to finish mapping the character code signals of a page.

It is another object of the present invention to provide an electronic printer of the type wherein multi-page documents to be printed are received as character code signals which are repeatedly applied in page sequence to a pattern generator for mapping and rasterization to produce a plurality of collated printed sets, with means for producing a signal representing the number of skip cycles required while the print engine waits for the pattern generator to finish mapping the character code signals of each page during the first printing of the multi-page document.

It is yet another object of the present invention to provide an electronic printer of the type wherein multi-page documents to be printed are received as character code signals which are repeatedly applied in page sequence to a pattern generator for mapping and rasterization to produce a plurality of collated printed sets, with means for producing a signal representing the number of skip cycles required while the print engine waits for the pattern generator to finish mapping the character code signals of each page during the first printing of the multi-page document; and which on subsequent printings of the document, for comparing the required skip cycle signal to a predetermined threshold value whereby the print engine can be placed in a shutdown mode if the threshold value is exceeded for a particular page.

It is still another object of the present invention to provide an electronic printer of the type wherein multi-page documents to be printed are received as character code signals which are repeatedly applied in page sequence to a pattern generator for mapping and rasterization to produce a plurality of collated printed sets, with means for producing a signal representing the number of skip cycles required while the print engine waits for the pattern generator to finish mapping the character code signals of each page during the first printing of the multi-page document; and which on subsequent printings of the document, for comparing the required skip cycle signal to a predetermined threshold value whereby the print engine can be placed in a shutdown mode if the threshold value is exceeded for a particular page, and whereby the print engine is reactivated and ready to print upon completion of mapping of that page so that no time loss is incurred in starting back up.

It is yet another object of the present invention to provide an electronic printer of the type wherein multi-page documents to be printed are received as character code signals which are repeatedly applied in page sequence to a pattern generator for mapping and rasterization to produce a plurality of collated printed sets, with means for producing a signal representing the number of skip cycles required while the print engine waits for the pattern generator to finish mapping the character code signals of each page during the first printing of the multi-page document; and which on subsequent printings of the document, for comparing the required skip cycle signal to two predetermined threshold values whereby the print engine can be placed in a first shutdown mode if the lesser of the two threshold values is exceeded for a particular page and a second shutdown mode if the greater of the two threshold values is exceeded.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
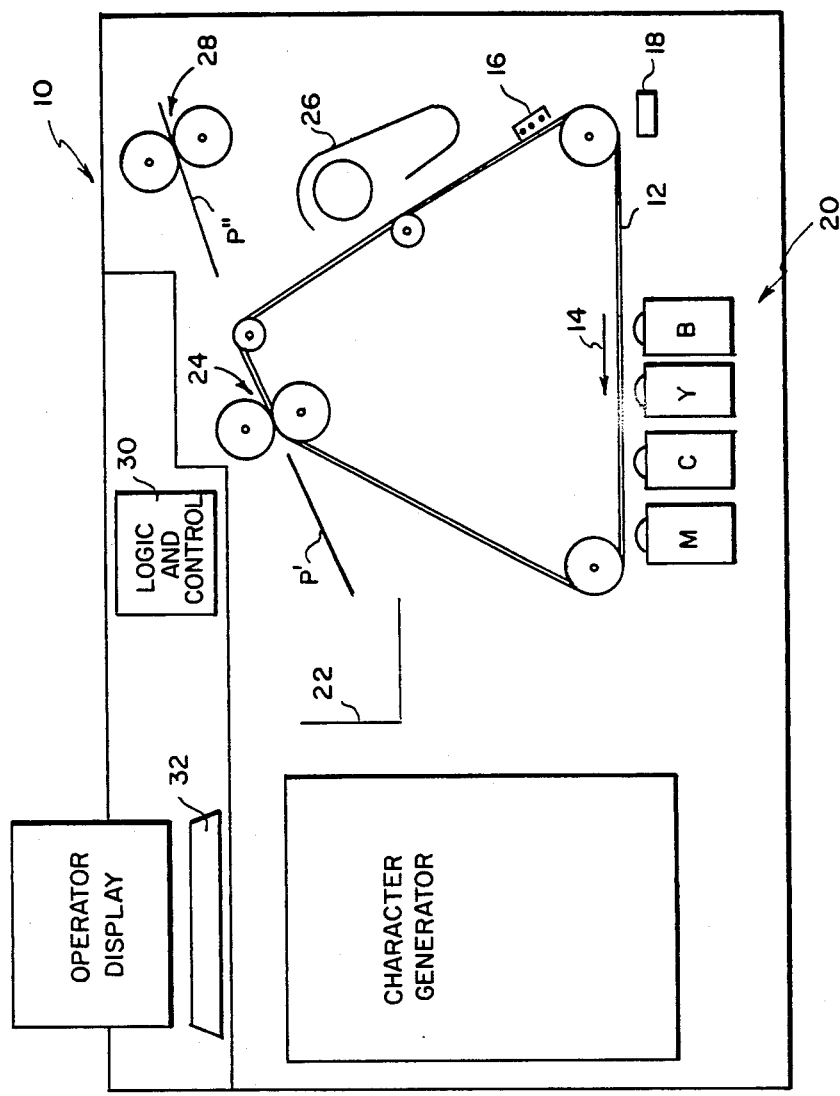
FIG. 1 is a schematic side elevational view of a electrostatographic printer in which the present invention is particularly useful.

Referring to FIG. 1, an electrostatographic printer 10 includes an endless photoconductive belt 12 supported on rollers for movement about a closed path in the direction of arrow 14. A plurality of image areas on belt 12 move past a series of electrostatographic process stations including a charging station 16, an exposure station 18 (preferably a light emitting diode array print head), and a multi-color development station 20 to produce toned images in a known manner.

Receiver members, often referred to as copy sheets, are fed from a supply hopper 22, and transported along a path P' to a transfer station 24 in timed relation with moving belt 12 so that the receiver member is in register with a toned image on belt 14. After transfer, residual toner is removed from the belt at a cleaning station 26. The receiver member is stripped from the belt and transported along path P" to a fuser assembly 28, where the transferred image is fixed to the receiver member by heat and/or pressure.

Control of the process stations of printer 10 is accomplished by a logic and control unit (LCU) 30 including a microprocessor. The microprocessor receives operator input from a control panel 32 and timing signals from sensors detecting movement of belt 12 and of receiver members. Based on such signals and on a program stored in the microprocessor, LSU 30 produces signals for controlling the timing operation of the various process stations and for turning on and off the main drive motor for moving belt 12.

When, during the making of prints, the control logic of the print engine determines that a photoconductor latent electrostatic image will not be available for toning as that image area of the belt passes through development station 20, a skip cycle is executed. By definition, a skip cycle is a mode of operation where no receiver member is fed to the printer's transfer station 24, where the image area is not charged (or is charged and then erased) and where fuser station 28 may be deactivated.

Figure 2:
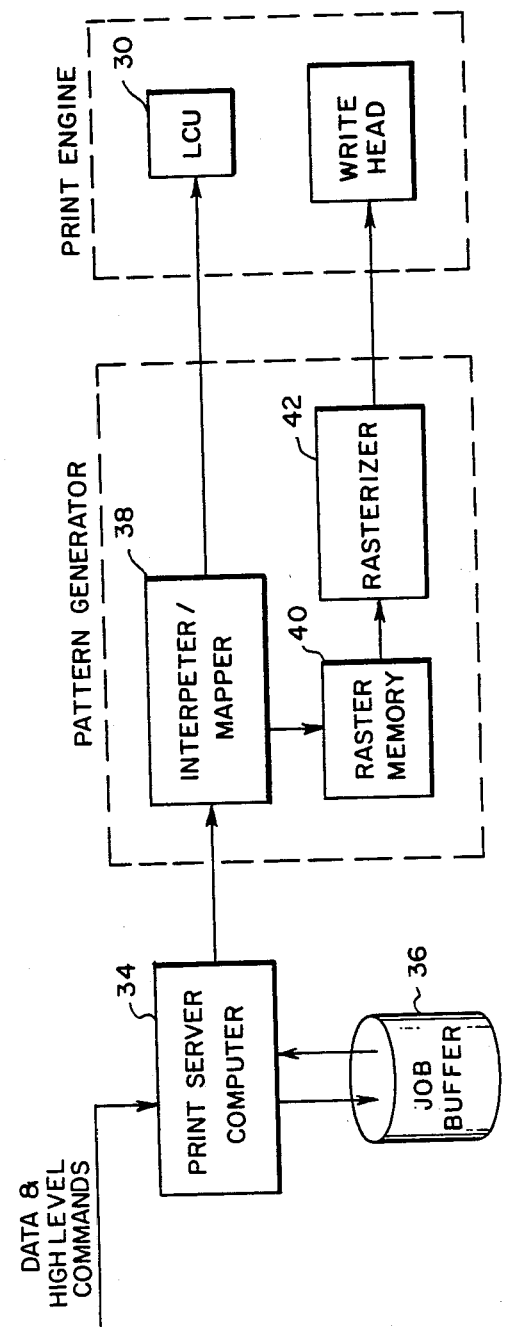
FIG. 2 is a block diagram of portions of the printer of FIG. 1 in accordance with a preferred embodiment of the present invention.

Referring to FIG. 2, a print server computer 34 receives high level commands and data in character code form from a main frame computer, network link, data processing work station, or the like. The commands are translated into machine control language by the print server computer. A job buffer 36 stores incoming jobs, resident fonts, and program codes for use by the print server computer.

Multi-page documents stored in job buffer 36 as character code signals are repeatedly applied in page sequence to a pattern generator 37 for rasterization to produce a plurality of collated printed sets. An interpreter/mapper 38 converts the character code data to a pixel pattern map; separating, for color prints, the information into four raster patterns, one for ech color available at development 20. The pixel pattern map is stored in a raster memory 40, from which it can be rasterized at 42 and sent to a print engine as discussed with reference to FIG. 1.

While the pixel pattern map is being rasterized at 42, interpreter/mapper 38 sends page information to LCU 30, updating the LCU as to the set and the page being rasterized. For example, the interpreter/mapper might send the following sequence of signals to the LCU for a job where "n" sets of a document having "m" pages is to be produced:

--- set #1, page #1, mapping started;
set #1, page #1, mapping stopped;
set #1, page #2, mapping started;
set #1, page #2, mapping stopped;
set #1, page #3, mapping started;

.
.
.

set #1, page #m, mapping stopped;
set #2, page #1, mapping started;

.
.
.

set #n, page #m, mapping stopped.

---

Figure 3:
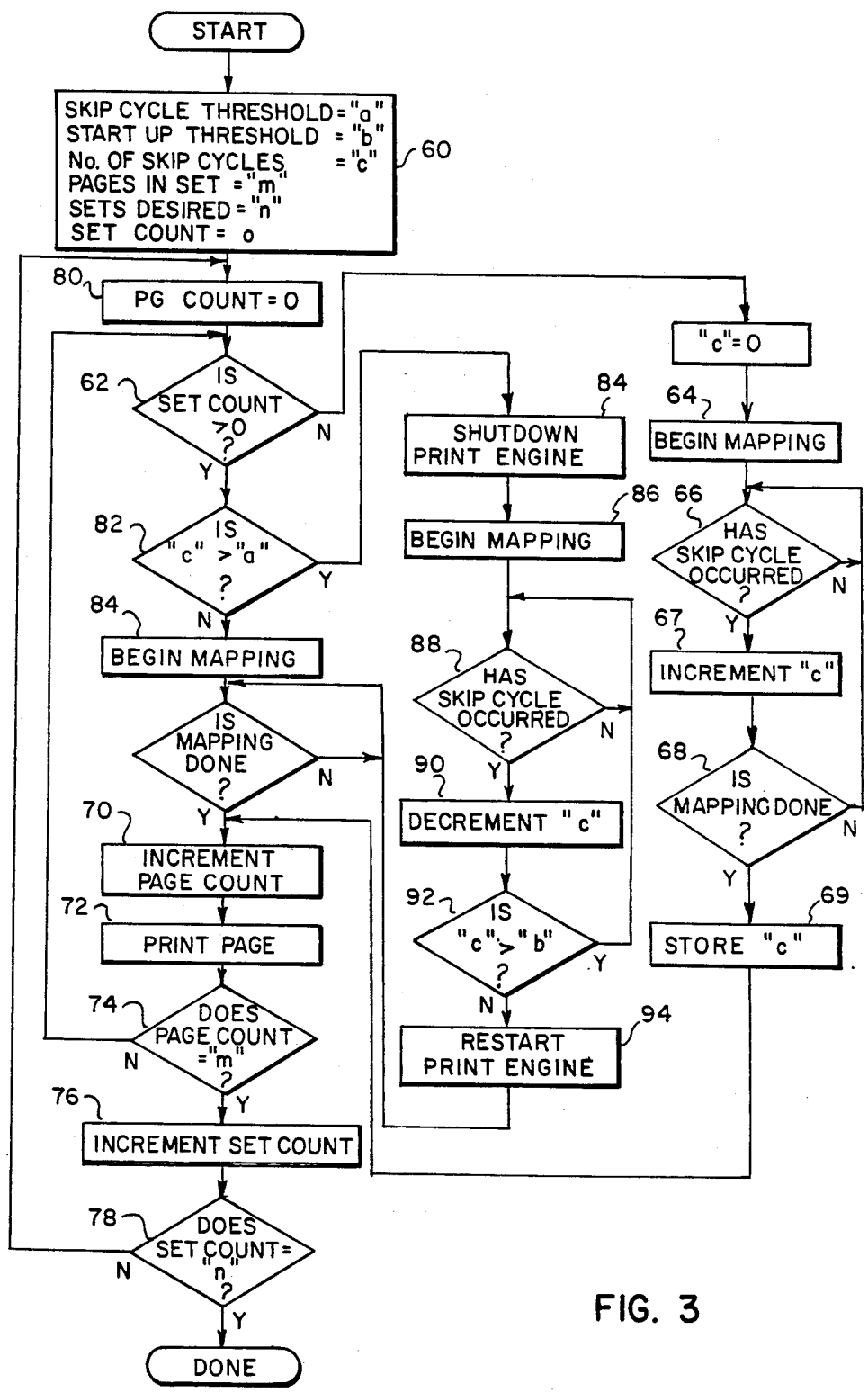
FIG. 3 is a logic flow diagram of the operation of the printer of FIG. 2.

With reference to step 60 of FIG. 3, a threshold quantity "a" of skip cycles is available for a particular print engine. If the threshold quantity of skip cycles is exceeded, the print engine should, for the practical reasons discussed above, be placed in a shutdown mode. Also available for any particular print engine is the threshold quantity "b" of skip cycles required after the print engine has been restarted before it is ready to produce a print. Quantities "a" and "b" may be service selectable. The number of skip cycles required for a particular page is represented by "c". Of course the numbers "m" and "n" for printing n sets of a document of m pages are known.

During the printing of the first set, as determined at step 64, mapping beings (step 64) and LCU 30 keeps track of the number "c" of skip cycles required to fill the period (steps 66-69). After mapping is completed for each page of the first set, the page count is increment (step 70), the page is printed (step 72), and the process is repeated for the next page of the document until, as determined at step 74, all pages of the document have been printed to complete one set.

The set count is increment (step 76). If more sets are desired (step 78), the page count is reset (step 80) and the stored quantity "c" for the number of skip cycles required for the page to be mapped is compared to the predetermined threshold quantity "a" for the print engine (step 82). If the quantity "a" would not be exceeded by the skip cycles required during mapping of that particular page, mapping begins (step 84) while the print engine goes into a skip cycle mode. On the otherhand, if the value "a" would be exceeded by the skip cycles required during mapping of that particular page, a shutdown of the print engine is ordered (step 84) and mapping begins (step 86). Each time a skip cycle occurs during the mapping (step 88), the quantity "c" is decremented (step 90).

When the number of skip cycles required to complete the mapping of the page is no longer greater than the quantity "b" required to get the print engine back on line (step 92), the print engine is restarted (step 94) so that no time loss is incurred in starting back up.

In an alternative method, the signal representing the number of skip cycles required is compared to two predetermined threshold values, whereby the print engine can be placed in a first shutdown mode if the lesser of the two threshold values is exceeded for a particular page and a second shutdown mode if the greater of the two threshold values is exceeded. The first shut down mode is partial, and only the image processing stations are deactivated, while the second, more complete, shut down mode (e.g., turns off the main drive).

In yet another embodiment of the present invention, rather than counting skip cycles, rasterizer 42 may include a clock which keeps track of the time interval required for mapping each page of the set. during subsequent runs, the stored interval could be compared to a predetermined threshold, and the LCU commanded to shut down the printer whenever a page is being mapped which exceeds the threshold.

The invention has been described in detail with particular reference to preferred embodiments thereof, but it will be understood that variations and modifications can be effected within the spirit and scope of the invention.

What is claimed is:

1. In an electronic printer of the type including a pattern generator and means for repeatedly applying multi-page documents received as character code signals to the pattern generator for mapping and rasterization to produce plural collated printed sets, the improvement comprising means for predicting the number of skip cycles required while the print engine is waiting for the pattern generator to finish a page.

2. In an electronic printer of the type including a pattern generator and means for repeatedly applying multi-page documents received as character code signals to the pattern generator for mapping and rasterization to produce plural collated printed sets, the improvement comprising means for producing a signal representing the number of skip cycles required for each page during the first printing of the document.

3. In an electronic printer for the type including a pattern generator and means for repeatedly applying multi-page documents received as character code signals to the pattern generator for mapping and rasterization to produce plural collated printed sets, the improvement comprising:
    means for producing a signal representing the number of skip cycles required for each page during the first printing of the document;
    means, operable on subsequent printings of the document, for comparing the required skip cycle signal to a predetermined threshold value; and
    means for placing the print engine in a shutdown mode if the threshold value is exceeded for a particular page.

4. In an electronic printer of the type including a pattern generator and means for repeatedly applying multi-page documents received as character code signals to the pattern generator for mapping and rasterization to produce plural collated printed sets, the improvement comprising:
    means for producing a signal representing the number of skip cycles required for each page during the first printing document;
    means, operable on subsequent printings of the document, for comparing the required skip cycle signal to a predetermined threshold value;
    means for placing the print engine in a shutdown mode if the threshold value is exceeded for a particular page; and
    means for reactivating the print engine upon completion of the mapping of that page, whereby time loss is incurred in starting back up.

5. In an electronic printer of the type including a pattern generator and means for repeatedly applying multi-page documents received as character code signals to a pattern generator for mapping and rasterization to produce plural collated printed sets, the improvement comprising:
    means for producing a signal representing the number of skip cycles required for each page during the first printing of the document;
    means, operable on subsequent printings of the document, for comparing the required skip cycle signal to two predetermined threshold values; and
    means for placing the print engine in a first shutdown mode if the lesser of the two threshold values is exceeded for a particular page, and a second shutdown mode if the greater of the two threshold values is exceeded.

* * * * *